(12) United States Patent
Noguchi et al.

(10) Patent No.: US 11,370,416 B2
(45) Date of Patent: Jun. 28, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Yasushi Shoda, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 16/810,882

(22) Filed: Mar. 6, 2020

(65) Prior Publication Data

US 2020/0298837 A1    Sep. 24, 2020

(30) Foreign Application Priority Data

Mar. 19, 2019 (JP) .............................. JP2019-051583

(51) Int. Cl.
*B60W 30/06* (2006.01)
*B60W 10/04* (2006.01)
*B60W 50/14* (2020.01)
*B60W 50/02* (2012.01)
*B60W 10/20* (2006.01)

(52) U.S. Cl.
CPC ............ *B60W 30/06* (2013.01); *B60W 10/04* (2013.01); *B60W 10/20* (2013.01); *B60W 50/0205* (2013.01); *B60W 50/14* (2013.01); *B60W 2050/021* (2013.01); *B60W 2510/24* (2013.01)

(58) Field of Classification Search
CPC ...... B60W 30/06; B60W 10/04; B60W 50/14; B60W 50/0205; B60W 10/20; B60W 2050/021; B60W 2510/24; B62D 15/0285; G05D 1/024; G05D 1/0251; G05D 1/025;

(Continued)

(56) References Cited

U.S. PATENT DOCUMENTS 10,513,244 B2 * 12/2019 Murakami ............ B60W 30/06
2003/0109246 A1 * 6/2003 Shimizu ............. H04M 1/72463
                                                                    455/411

(Continued)

FOREIGN PATENT DOCUMENTS

JP        2017-182263        10/2017

*Primary Examiner* — Jonathan M Dager
*Assistant Examiner* — Jean W Charleston
(74) *Attorney, Agent, or Firm* — Amin, Turocy & Watson, LLP

(57) ABSTRACT

A vehicle control system includes a recognizer that recognizes a peripheral situation of a vehicle, a driving controller that automatically performs speed control and steering control of the vehicle on the basis of a recognition result of the recognizer, and a determiner that determines whether a predetermined condition indicating that automated parking is not adequate is satisfied when a user exits the vehicle. The driving controller causes the vehicle to start to travel from a stop state and stop at a parking lot in a case where it is determined by the determiner that the predetermined condition is not satisfied, and causes the vehicle not to start to travel from a stop state and stop at a parking lot in a case where it is determined by the determiner that the predetermined condition is satisfied.

10 Claims, 10 Drawing Sheets

(58) Field of Classification Search
CPC .............. G05D 1/0261; G05D 1/0223; G05D 2201/0212
USPC ......................................................... 701/41
See application file for complete search history.

(56) References Cited

U.S. PATENT DOCUMENTS

| | | | |
|---|---|---|---|
| 2009/0018734 A1* | 1/2009 | Hayama | B60R 25/04 |
| | | | 701/54 |
| 2010/0231349 A1* | 9/2010 | Tanaka | B60R 25/24 |
| | | | 340/426.22 |
| 2015/0375740 A1* | 12/2015 | Okamura | B62D 15/0285 |
| | | | 701/25 |
| 2018/0001930 A1* | 1/2018 | Sham | G01S 17/931 |
| 2019/0202442 A1* | 7/2019 | Lavoie | H04W 4/023 |
| 2019/0286135 A1* | 9/2019 | Yasuda | B62D 15/0285 |
| 2019/0389465 A1* | 12/2019 | Ogino | B60W 30/18009 |
| 2020/0001867 A1* | 1/2020 | Mizutani | B60W 30/0956 |
| 2020/0039508 A1* | 2/2020 | Onishi | G08G 1/166 |

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2019-051583, filed Mar. 19, 2019, the content of which is incorporated herein by reference.

BACKGROUND

Field of the Invention

The present invention relates to a vehicle control system, a vehicle control method, and a storage medium.

Description of Related Art

In recent years, there has been progress in research for automatic control of a vehicle. In connection with this, a technique for notifying an occupant's terminal device of the position of a vehicle parked by automated driving has been known (for example, Japanese Unexamined Patent Application, First Publication No. 2017-182263).

SUMMARY OF THE INVENTION

Incidentally, even when parking of a vehicle by automated driving is started, it is preferable to stop parking of the vehicle in a case where there is a lost belonging, or the safety of an occupant or the vehicle is not able to be secured. However, in the related art, it was difficult to stop parking of a vehicle by automated driving in some cases.

The present invention was contrived in view of such circumstances, and one object thereof is to provide a vehicle control system, a vehicle control method, and a storage medium that make it possible to suppress the occurrence of inconvenience due to inadvertent automatic control in a state in which the perimeter of a vehicle is not monitored by an occupant.

A vehicle control system, a vehicle control method, and a storage medium according to this invention have the following configurations adopted therein.

(1) According to a first aspect of the present invention, there is provided a vehicle control system including: a recognizer that recognizes a peripheral situation of a vehicle; a driving controller that automatically performs speed control and steering control of the vehicle on the basis of a recognition result of the recognizer; and a determiner that determines whether a predetermined condition indicating that automated parking is not adequate is satisfied when a user exits the vehicle, wherein the driving controller causes the vehicle to start to travel from a stop state and stop at a parking lot in a state in which the perimeter of the vehicle is not monitored by the user or persons other than the user in a case where it is determined by the determiner that the predetermined condition is not satisfied, and causes the vehicle not to start to travel from a stop state and stop at a parking lot in a state in which the perimeter of the vehicle is not monitored by the user or persons other than the user in a case where it is determined by the determiner that the predetermined condition is satisfied.

(2) In the aspect of the above (1), the recognizer further recognizes an object which is placed inside the vehicle, and the predetermined condition includes that it is recognized by the recognizer that a terminal device executing an instruction to cause the vehicle to exit the parking lot is placed inside the vehicle.

(3) In the aspect of the above (1), the vehicle control system further includes an acquirer that acquires a remaining energy amount of the vehicle, and the predetermined condition includes that a travelable distance that the vehicle is able to travel with the remaining energy amount acquired by the acquirer is equal to or less than a criterion.

(4) In the aspect of the above (1), the vehicle control system further includes a failure detector that detects a failure of a detection device referring to a result of the recognizer, and the predetermined condition includes that the failure of the detection device is detected by the failure detector.

(5) In the aspect of the above (1), the recognizer further recognizes an object which is present inside the vehicle, and the predetermined condition includes that it is recognized by the recognizer that a person is present inside the vehicle.

(6) In the aspect of the above (3), the vehicle control system further includes a notificator that notifies the user of various types of information, the determiner determines whether the predetermined condition is satisfied after a user exits the vehicle, and the notificator notifies the user's terminal device that the predetermined condition is satisfied in a case where it is determined that the predetermined condition is satisfied after the user exits the vehicle.

(7) In the aspect of the above (1), the driving controller causes the vehicle to start to travel from a stop state and stop at a parking lot in a state in which the perimeter of the vehicle is not monitored by the user or persons other than the user in a case where it is determined by the determiner that the predetermined condition is not satisfied after it is determined by the determiner that the predetermined condition is satisfied.

(8) According to an aspect of this invention, there is provided a vehicle control method including causing a computer to: recognize a peripheral situation of a vehicle; automatically perform speed control and steering control of the vehicle on the basis of a recognition result; determine whether a predetermined condition indicating that automated parking is not adequate is satisfied when a user exits the vehicle; cause the vehicle to start to travel from a stop state and stop at a parking lot in a state in which the perimeter of the vehicle is not monitored by the user or persons other than the user in a case where it is determined that the predetermined condition is not satisfied; and cause the vehicle not to start to travel from a stop state and stop at a parking lot in a state in which the perimeter of the vehicle is not monitored by the user or persons other than the user in a case where it is determined that the predetermined condition is satisfied.

(9) According to an aspect of this invention, there is provided a computer readable non-transitory storage medium having a program stored therein, the program causing a computer to: recognize a peripheral situation of a vehicle; automatically perform speed control and steering control of the vehicle on the basis of a recognition result; determine whether a predetermined condition indicating that automated parking is not adequate is satisfied when a user exits the vehicle; cause the vehicle to start to travel from a stop state and stop at a parking lot in a state in which the perimeter of the vehicle is not monitored by the user or persons other than the user in a case where it is determined that the predetermined condition is not satisfied; and cause the vehicle not to start to travel from a stop state and stop at a parking lot in a state in which the perimeter of the vehicle is not monitored by the user or persons other than the user in a case where it is determined that the predetermined condition is satisfied.

According to the aspects of the above (1) to (9), it is possible to suppress the occurrence of inconvenience due to inadvertent automatic control in a state in which the perimeter of a vehicle is not monitored by an occupant.

According to the aspect of the above (2), it is possible to reduce much time and effort to go for a lost belonging to a parking lot.

According to the aspect of the above (3), it is possible to prevent a vehicle from stopping in the middle of entry or exit.

According to the aspect of the above (4), it is possible to appropriately park a vehicle.

According to the aspect of the above (5), it is possible to secure the safety of an occupant.

According to the aspect of the above (7), it is possible to reduce much time and effort to perform an instruction for parking based on automated driving.

DETAILED DESCRIPTION OF THE INVENTION

Hereinafter, an embodiment of a vehicle control device, a vehicle control method, and a storage medium of the present invention will be described with reference to the accompanying drawings. In the following, a case where rules of left-hand traffic are applied will be described, but in a case where rules of right-hand traffic are applied, the right and left may be interchanged.

[Overall Configuration]

Figure 1:
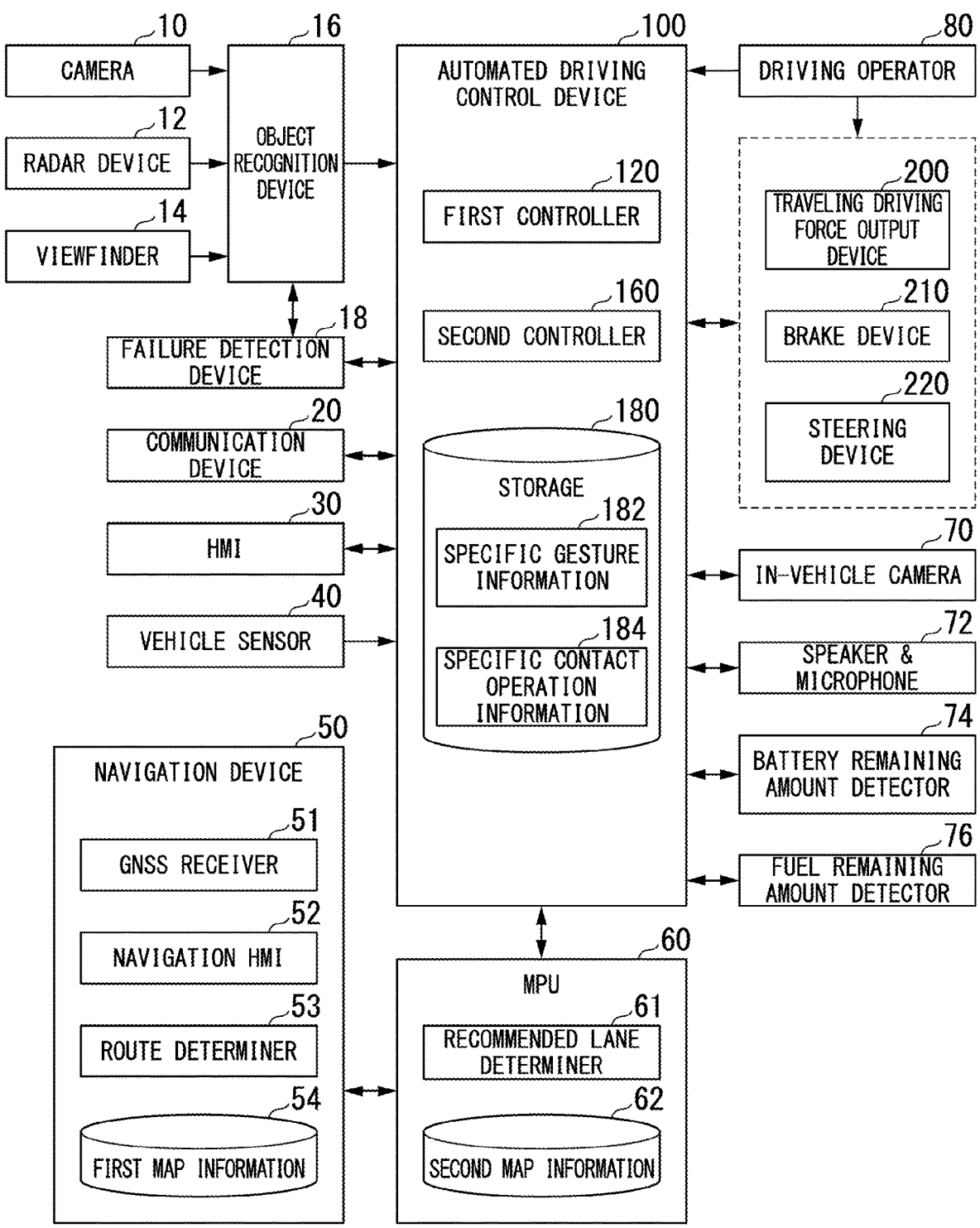
FIG. 1 is a configuration diagram of a vehicle system using a vehicle control device according to an embodiment.

FIG. 1 is a configuration diagram of a vehicle system 1 in which a vehicle control device according to an embodiment is used. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell. Hereinafter, a case where the driving source of a host vehicle M is a combination of an internal-combustion engine and an electric motor will be described.

The vehicle system 1 includes, for example, a camera 10, a radar device 12, a viewfinder 14, an object recognition device 16, a failure detection device 18, a communication device 20, a human machine interface (HMI) 30, a vehicle sensor 40, a navigation device 50, a map positioning unit (MPU) 60, an in-vehicle camera 70, a specific contact operation detection device 72, a battery remaining amount detector 74, a fuel remaining amount detector 76, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and portions of the configuration may be omitted, or other configurations may be further added thereto.

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein (hereinafter referred to as the host vehicle M). The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The viewfinder 14 is a light detection and ranging (LIDAR) viewfinder. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition result to the automated driving control device 100. The object recognition device 16 may output the detection results of the camera 10, the radar device 12, and the viewfinder 14, as they are, to the automated driving control device 100. The object recognition device 16 may be omitted from the vehicle system 1.

The failure detection device 18 detects failures of components that detect the periphery of the host vehicle M (such as, for example, the camera 10, the radar device 12, the viewfinder 14, or the object recognition device 16) among components included in the vehicle system 1. Hereinafter, in a case where the failures of components that detect the periphery of the host vehicle M (for example, the camera 10, the radar device 12, the viewfinder 14, or the object recognition device 16) need not be distinguished from each other, these components are described as a "detection device." The failure detection device 18 presumes that the detection device is out of order, for example, in a case where output of a result of detection performed by the detection device is interrupted, a case where the result of detection performed by the detection device shows an abnormal value, a case where the operation of the detection device is stopped, or the like. For example, in a case where a portion or the entirety of the detection device is out of order, the failure detection device 18 presumes that the detection device is out of order. The failure detection device 18 is an example of a "failure detector."

The communication device 20 communicates with another vehicle or a parking lot management device (to be described later) which is present in the periphery of the host vehicle M, or various server devices using, for example, a cellular network, a Wi-Fi network, Bluetooth (registered trademark), dedicated short range communication (DSRC), or the like.

The HMI 30 presents various types of information to an occupant of the host vehicle M, and accepts the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 decides, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal (hereinafter referred to as a terminal device TM) possessed by an occupant. The navigation device 50 may transmit its current position and destination to a navigation server through the communication device 20 and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and decides a recommended lane for each block with reference to the second map information 62. The recommended lane determiner 61 makes a decision on which lane from the left to travel along. In a case where a branch point is present in the route on a map, the recommended lane determiner 61 decides a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated at any time by the communication device 20 communicating with another device.

The in-vehicle camera 70 is a digital camera using a solid-state imaging element such as, for example, a CCD or a CMOS. The in-vehicle camera 70 is a camera for capturing an image of an object placed inside a vehicle. The in-vehicle camera 70 is, for example, installed at any points where the internal state of the host vehicle M can be imaged. The in-vehicle camera 70 images the internal state of the host vehicle, for example, at a predetermined timing or periodically repeatedly. The in-vehicle camera 70 may be a stereo camera.

The specific contact operation detection device 72 includes, for example, a sound detector that detects a sound of knocking on the host vehicle M or a contact detector that detects an operation of stroking the host vehicle M. A sound sensor is realized by, for example, a microphone installed inside a vehicle, and a contact sensor is realized by, for example, a touch panel installed on the car body surface of the host vehicle M.

The battery remaining amount detector 74 detects a secondary storage battery (for example, state of charge (SoC)) that supplies power to an electric motor which is a driving source included in the host vehicle M.

The fuel remaining amount detector 76 detects the remaining amount of fuel (gasoline) used in the combustion of an internal-combustion engine included in the host vehicle M, or the remaining amount of fuel (such as, for example, hydrogen, hydrocarbon, or alcohol) used in power generation of a fuel battery. In the following description, in a case where the secondary storage battery and the fuel battery need not be distinguished from each other, these are described as a battery.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, a second controller 160, and a storage 180. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device. Specific gesture information 182 and specific contact operation information 184 are stored in the storage 180. The details of the specific gesture information 182 and the specific contact operation information 184 will be described later.

Figure 2:
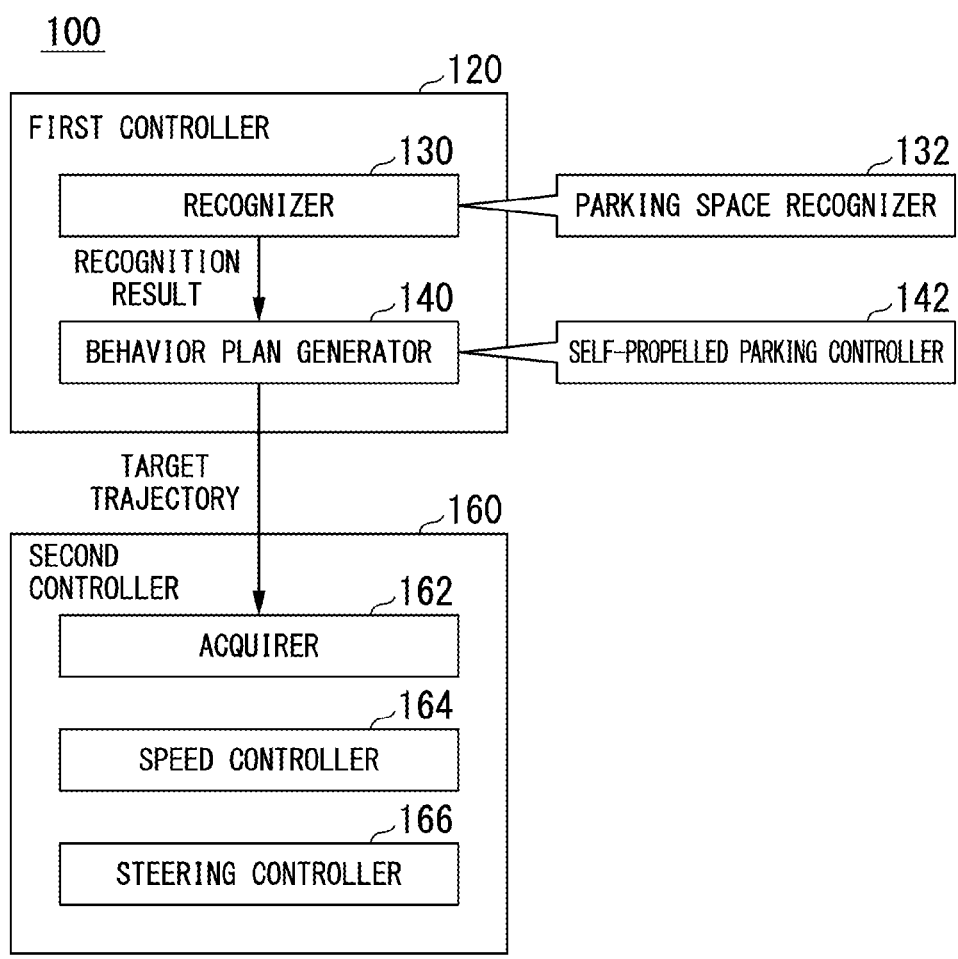
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep leaning or the like and recognition based on conditions (such as a signal or a road sign on which pattern matching is possible) imparted in advance being concurrently executed and being comprehensively evaluated by performing scoring on both. Thereby, the reliability of automated driving is secured.

The recognizer 130 recognizes the position and speed of an object near the host vehicle M, and the state of acceleration or the like on the basis of information which is input from the camera 10, the radar device 12, and the viewfinder 14 through the object recognition device 16. The position of the object is recognized as, for example, a position in absolute coordinates with a representative point (such as the centroid or the center of a drive shaft) of the host vehicle M as an origin and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a lane (traveling lane) along which the host vehicle M travels. For example, the recognizer 130 recognizes a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. The recognizer 130 recognizes a stop line, an obstacle, a red light, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned along the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane.

The recognizer 130 recognizes an object which is present inside the host vehicle M on the basis of an image captured by the in-vehicle camera 70. For example, the function of "recognizing an object which is present inside a vehicle" is realized by the recognition of an object based on deep learning or the like. The recognizer 130 recognizes the position of generation of a knock sound of an occupant's knocking on the host vehicle M, the rhythm of the knock sound, the number of times of the knock sound within a predetermined time, or the like on the basis of a sound detected by a microphone. The recognizer 130 recognizes an operation of stroking the host vehicle M detected by a touch panel.

The recognizer 130 includes a parking space recognizer 132 which is started up in a self-propelled parking event to be described later. The details of the function of the parking space recognizer 132 will be described later.

The behavior plan generator 140 generates a target trajectory along which the host vehicle M will travel in the future automatically (irrespective of a driver's operation) so that the host vehicle M travels in the recommended lane decided by the recommended lane determiner 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points.

The behavior plan generator 140 may set automated driving events when generating a target trajectory. Examples of automated driving events include a constant-speed traveling event, a low-speed following traveling event, a lane change event, a diverging event, a merging event, an overtaking event, a self-propelled parking event of parking a vehicle through unmanned traveling in valet parking, and the like. The behavior plan generator 140 generates a target trajectory according to a started event. The behavior plan generator 140 includes a self-propelled parking controller 142 which is started up in a case where the self-propelled parking event is executed. The details of the function of the self-propelled parking controller 142 will be described later.

The second controller 160 controls the traveling driving force output device 200, the brake device 210, and the steering device 220 so that the host vehicle M passes along the target trajectory generated by the behavior plan generator 140 according to scheduled times.

Referring to FIG. 2, the second controller 160 includes, for example, an acquirer 162, a speed controller 164, and a steering controller 166. The acquirer 162 acquires information of the target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory. A combination of the behavior plan generator 140 and the second controller 160 is an example of a "driving controller."

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 80 and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80 and changes the direction of the turning wheel.

[Self-Propelled Parking Event—During Entry]

Figure 3:
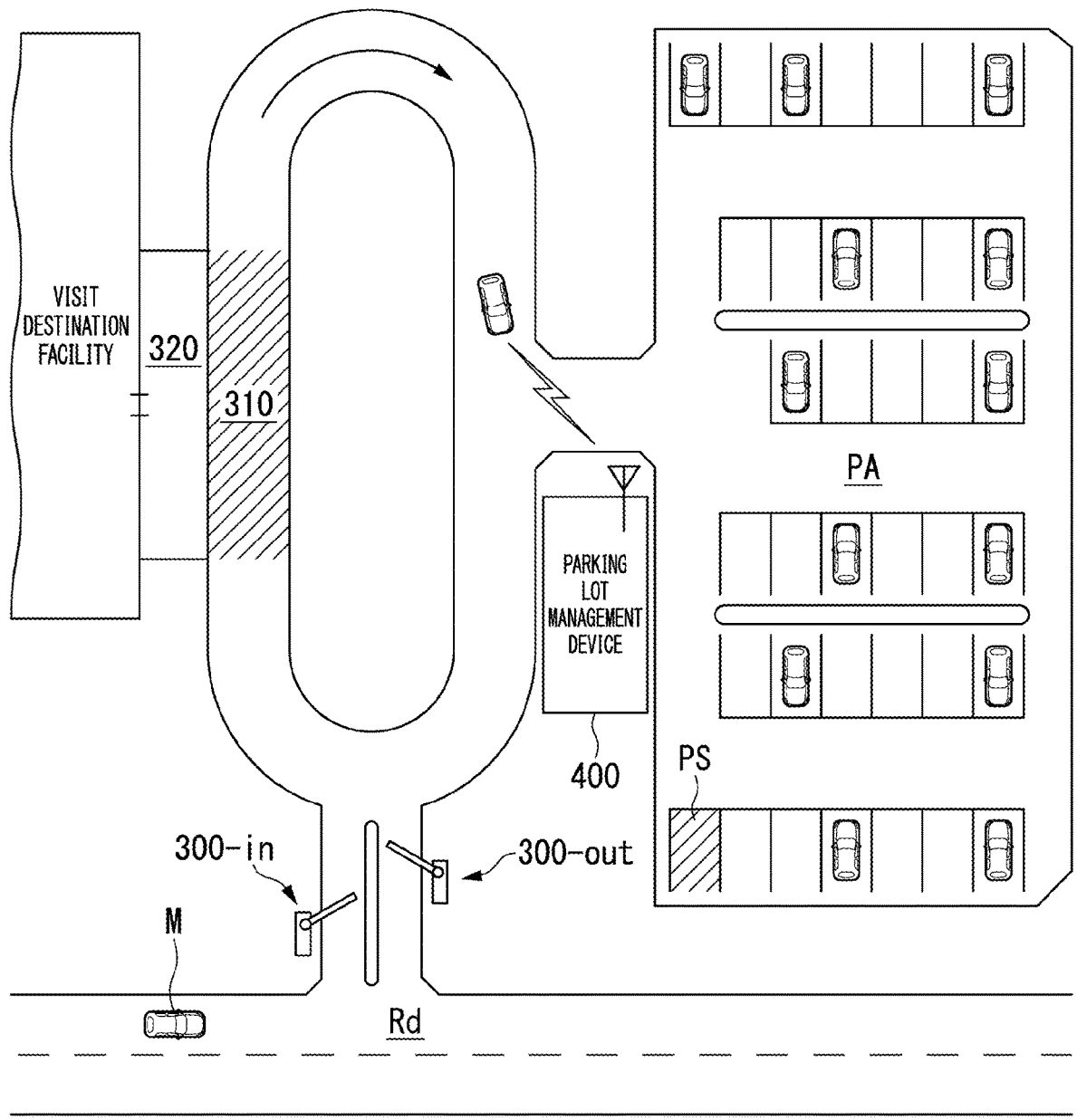
FIG. 3 is a diagram schematically illustrating a situation in which a self-propelled parking event is executed.

The self-propelled parking controller 142 parks the host vehicle M within a parking space, for example, on the basis of information acquired from a parking lot management device 400 by the communication device 20. FIG. 3 is a diagram schematically illustrating a situation in which the self-propelled parking event is executed. Gates 300-in and 300-out are provided on a route from a road Rd to a visit destination facility. The host vehicle M advances to a stop area 310 through the gate 300-in by manual driving or automated driving. The stop area 310 faces a boarding and exit area 320 which is connected to the visit destination facility. The boarding and exit area 320 is provided with eaves for blocking rain or snow.

The host vehicle M performs automated driving after an occupant exits the vehicle in the stop area 310, and starts the self-propelled parking event for movement to a parking space PS within a parking lot PA. The details of a start trigger of the self-propelled parking event relating to entry will be described later. In a case where the self-propelled parking event is started, the self-propelled parking controller 142 controls the communication device 20 and transmits a request for parking toward the parking lot management device 400. The host vehicle M moves from the stop area 310 to the parking lot PA in accordance with the guidance of the parking lot management device 400 or while performing sensing by itself.

Figure 4:
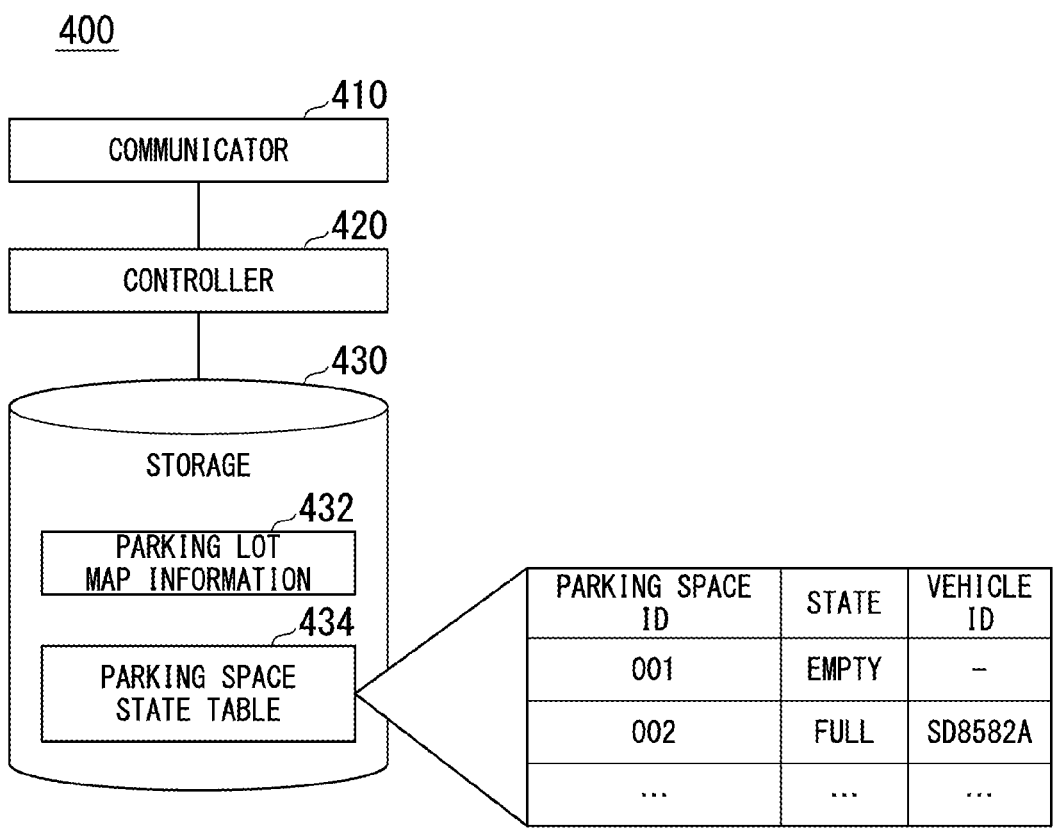
FIG. 4 is a diagram illustrating an example of a configuration of a parking lot management device.

FIG. 4 is a diagram illustrating an example of a configuration of the parking lot management device 400. The parking lot management device 400 includes, for example, a communicator 410, a controller 420, and a storage 430. The storage 430 stores information such as parking lot map information 432 and a parking space state table 434.

The communicator 410 communicates with the host vehicle M and other vehicles wirelessly. The controller 420 guides a vehicle to the parking space PS on the basis of information acquired by the communicator 410 and information stored in the storage 430. The parking lot map information 432 is information geometrically indicating the structure of the parking lot PA. The parking lot map information 432 includes coordinates for each parking space PS. In the parking space state table 434, for example, a state indicating an empty state or a full (parked) state with respect to a parking space ID which is identification information of the parking space PS and a vehicle ID which is identification information of a parked vehicle in the case of a full state are associated with each other.

In a case where the communicator 410 receives a request for parking from a vehicle, the controller 420 refers to the parking space state table 434, to extract a parking space PS of which the state is an empty state, acquire the position of the extracted parking space PS from the parking lot map information 432, and transmit a suitable route to the acquired position of the parking space PS to the vehicle using the communicator 410. The controller 420 instructs a specific vehicle to stop, slow down, or the like as necessary on the basis of positional relationships between a plurality of vehicles so that the vehicles advance to the same position simultaneously.

In the vehicle that has received a route (hereinafter referred to as the host vehicle M), the self-propelled parking controller 142 generates a target trajectory based on the route. In a case where the parking space PS which is a target approaches, the parking space recognizer 132 recognizes a parking frame line or the like for partitioning the parking space PS, recognizes the detailed position of the parking space PS, and provides the recognized position to the self-propelled parking controller 142. The self-propelled parking controller 142 receives this to correct the target trajectory and parks the host vehicle M in the parking space PS.

[Self-Propelled Parking Event—During Exit]

The self-propelled parking controller 142 and the communication device 20 maintain an operating state even while the host vehicle M is parked. For example, in a case where the communication device 20 receives a request for a pickup car from the terminal device TM of an occupant, the self-propelled parking controller 142 starts up the system of the host vehicle M, and moves the host vehicle M to the stop area 310. In this case, the self-propelled parking controller 142 controls the communication device 20 and transmits a request for start to the parking lot management device 400. Similarly to the time of entry, the controller 420 of the parking lot management device 400 instructs a specific vehicle to stop, slow down, or the like as necessary on the basis of positional relationships between a plurality of vehicles so that the vehicles do not advance to the same position simultaneously. In a case where the vehicle M is moved to the stop area 310 and the occupant is picked up, the self-propelled parking controller 142 stops its operation, and thereafter, manual driving or automated driving based on another functional unit is started.

Without being limited to the above description, the self-propelled parking controller 142 may find a parking space in an empty state by itself on the basis of a detection result performed by the camera 10, the radar device 12, the viewfinder 14, or the object recognition device 16 irrespective of communication, and park the host vehicle M within the found parking space.

[Start Trigger of Self-Propelled Parking Event Relating to Entry]

A start trigger of the self-propelled parking event relating to entry may be, for example, some kind of operation performed by an occupant, or may be wireless reception of a predetermined signal from the parking lot management device 400. Hereinafter, a case where the start trigger of the self-propelled parking event relating to entry is (1) an occupant's gesture with respect to the host vehicle M or (2) an occupant's knock on the host vehicle M will be described.

[(1) Occupant's Gesture with Respect to Host Vehicle M]

When the self-propelled parking event relating to entry is started, the host vehicle M is stopped in the stop area 310, and an occupant exits the host vehicle M in the boarding and exit area 320. The recognizer 130 recognizes the motion (hereinafter, gesture) of the body such as the occupant's hand, head, or trunk, for example, on the basis of an image indicating the periphery of the host vehicle M captured by the camera 10 after all the doors of the host vehicle M are closed when the occupant exits the vehicle. The wording "when exiting the vehicle" is an interval of a predetermined time (such as, for example, several tens of [seconds] to a few [minutes]) after the occupant exits the vehicle and closes the door of the host vehicle M, or a period in which the occupant exits the vehicle and moves a predetermined distance (for example, a few [m] to a dozen [m]) or more from the host vehicle M. The recognizer 130 starts the self-propelled parking event relating to entry on the basis of the recognized gesture and the specific gesture information 182. The specific gesture information 182 is information in which information indicating the occupant's gesture and a command executed in the host vehicle M (in this example, a start command of the self-propelled parking event relating to entry) are associated with each other. The occupant's gesture is, for example, a motion of the body such as waving a hand toward a vehicle or pointing in the traveling direction of the host vehicle M with a hand or a finger. Hereinafter, a case where the specific gesture information 182 is information in which "a start command of the self-propelled parking event relating to entry" and "a gesture of waving a hand" are associated with each other will be described. The occupant's gesture with respect to the host vehicle M is an example of "the occupant's specific operation performed toward a car body."

Figure 5:
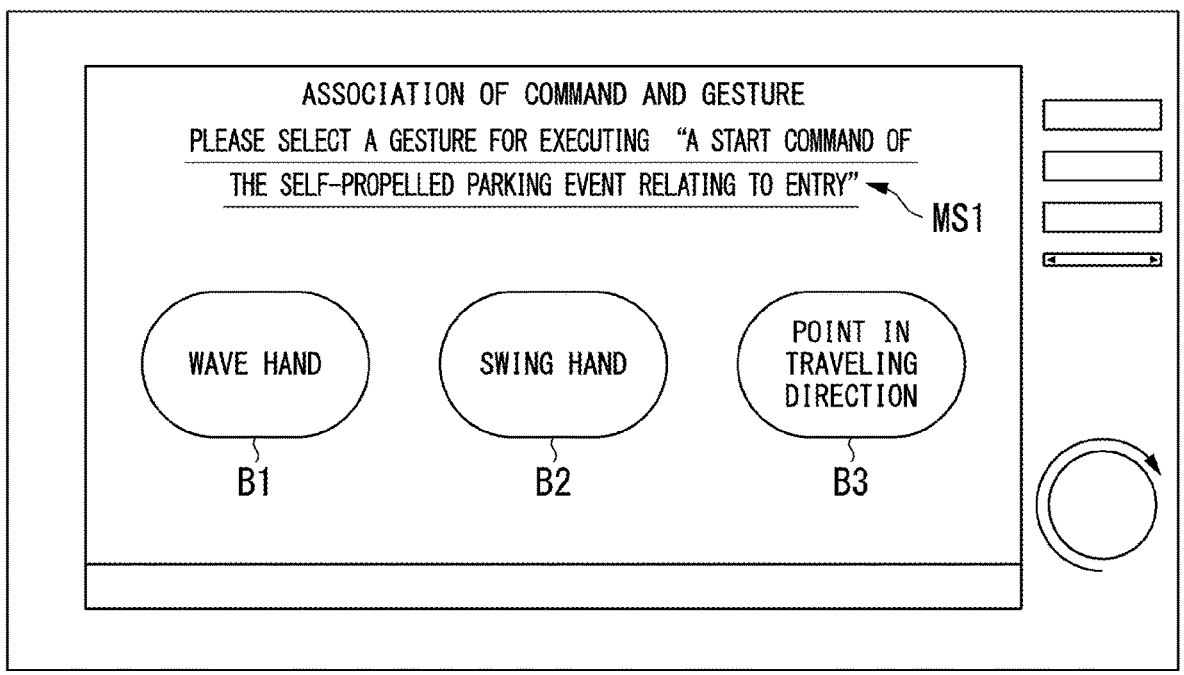
FIG. 5 is a diagram illustrating an example of an execution screen of an application for generation of specific gesture information.

The specific gesture information 182 is, for example, information in which a plurality of gestures capable of being recognized by the recognizer 130 and a command capable of being executed by a gesture are associated with each other. The specific gesture information 182 may be generated by the occupant of the host vehicle M associating a gesture with a command. The command capable of being executed by a gesture is, for example, a command capable of being executed even when the occupant of the host vehicle M is not on board the host vehicle M. FIG. 5 is a diagram illustrating an example of an execution screen IM1 of an application for generation of the specific gesture information 182. On the occasion of the generation of the specific gesture information 182, the automated driving control device 100 executes an application for generating the specific gesture information 182 and causes the HMI 30 to display the execution screen IM1. The execution screen IM1 includes a message MS1 for querying the occupant of the host vehicle M about a gesture associated with a certain command, and buttons B1 to B3 for selecting a gesture capable of being associated with the command (that is, capable of being recognized by the recognizer 130). The message MS1 is, for example, content such as "Please select a gesture for executing 'a start command of the self-propelled parking event relating to entry.'" A gesture capable of being associated with this command is, for example, "wave a hand," "point in a traveling direction," or the like. The occupant of the host vehicle M selects a gesture on the basis of the execution screen IM1 displayed on the HMI 30, and the automated driving control device 100 generates the specific gesture information 182 by associating a gesture selected by the occupant with a command.

A process of generating the specific gesture information 182 may be performed in the occupant's terminal device TM of the host vehicle M. In this case, the automated driving control device 100 receives the specific gesture information 182 generated in the occupant's terminal device TM through a network and stores the received specific gesture information 182 in the storage 180.

Figure 6:
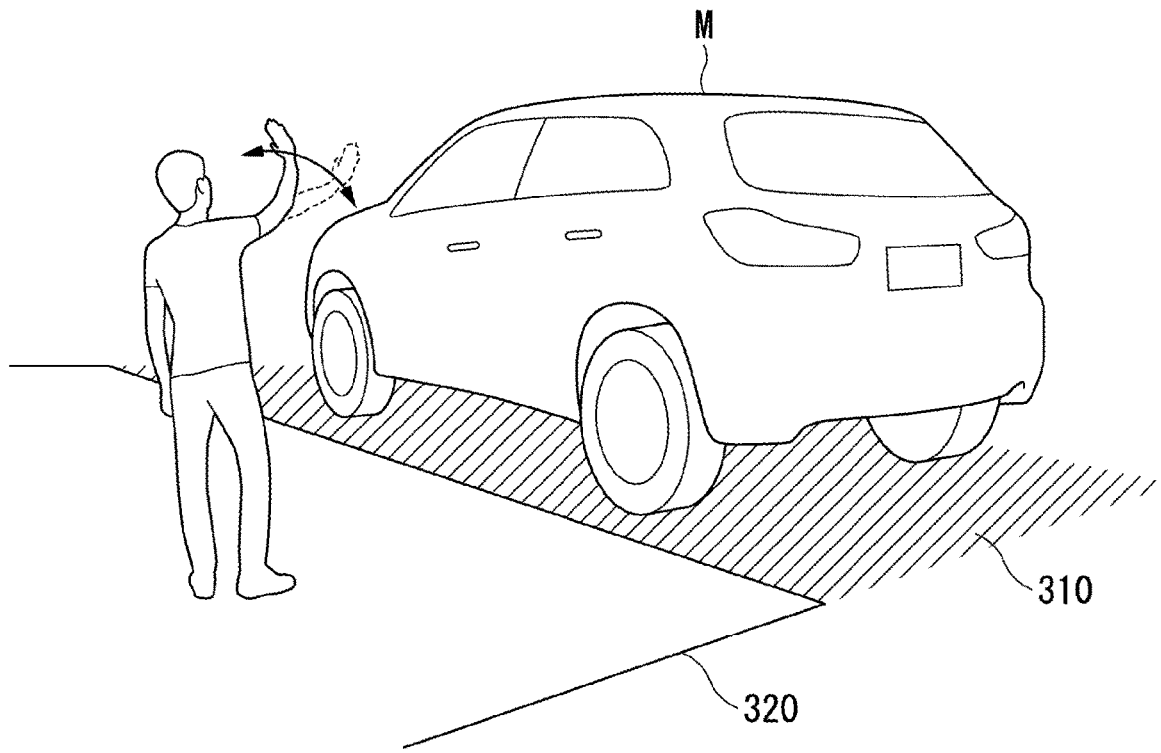
FIG. 6 is a diagram illustrating an example of a start situation based on a gesture in the self-propelled parking event relating to entry.

FIG. 6 is a diagram illustrating an example of a start situation based on a gesture of the self-propelled parking event relating to entry. In FIG. 6, an occupant exits the host vehicle M in the boarding and exit area 320, and then performs a gesture of waving a hand with respect to the host vehicle M. The recognizer 130 recognizes that the occupant performs a gesture of waving a hand with respect to the host vehicle M on the basis of an image indicating the periphery of the host vehicle M captured by the camera 10. The recognizer 130 searches the specific gesture information 182 using content of the recognized gesture, and specifies "a start of the self-propelled parking event relating to entry" which is a command associated with "a gesture of waving a hand with respect to the host vehicle M." The self-propelled parking controller 142 executes the self-propelled parking event relating to entry in a case where the command of "a start of self-propelled parking event relating to entry" is recognized by the recognizer 130.

[(2) Occupant's Knock on Host Vehicle M]

Figure 7:
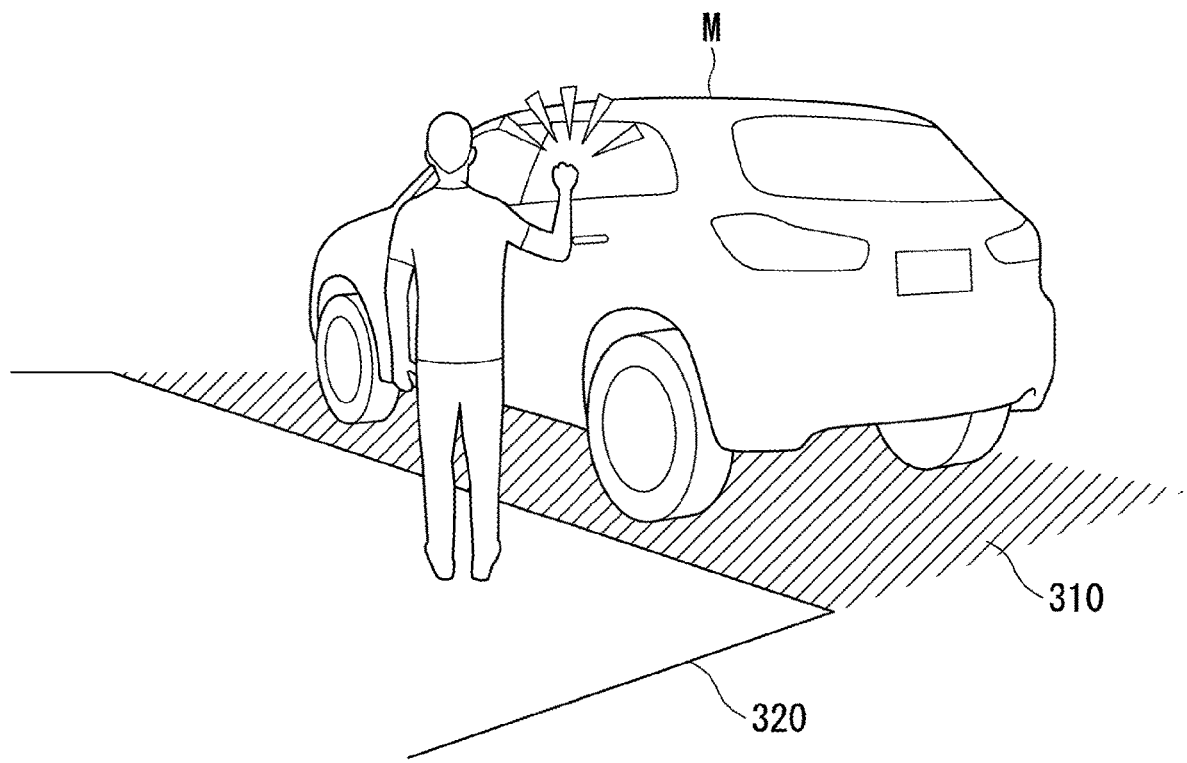
FIG. 7 is a diagram illustrating an example of a start situation based on a knock in the self-propelled parking event relating to entry.

FIG. 7 is a diagram illustrating an example of a start situation based on a knock of the self-propelled parking event relating to entry. When the self-propelled parking event relating to entry is started, the host vehicle M is stopped in the stop area 310, and an occupant exits the host vehicle M in the boarding and exit area 320. The recognizer 130 recognizes the occupant's knock on the basis of a sound detected by the specific contact operation detection device 72 (microphone) after all the doors of the host vehicle M are closed, for example, when the occupant exits the vehicle. The recognizer 130 starts the self-propelled parking event relating to entry on the basis of the recognized knock and the specific contact operation information 184. The specific contact operation information 184 is, for example, information including a record in which information indicating the occupant's knock and a command executed in the host vehicle M (in this example, a start command of the self-propelled parking event relating to entry) are associated with each other. The information indicating the occupant's knock is, for example, information indicating a predetermined rhythm or a predetermined number of times. Hereinafter, a case where the specific contact operation information 184 is information including a record in which a start command of the self-propelled parking event relating to entry and two consecutive knocks are associated with each other will be described. The occupant's knock on the host vehicle M is an example of "an occupant's specific operation performed on a car body."

The command capable of being executed by is a knock is, for example, a command capable of being executed even when the occupant of the host vehicle M is not on board the host vehicle M. On the occasion of generation of the specific contact operation information 184, the automated driving control device 100 executes an application for generating the specific contact operation information 184. wSince the subsequent processes are the same as the processes when the specific gesture information 182 is generated, the description thereof will not be given.

In FIG. 7, the occupant exits the host vehicle M in the boarding and exit area 320, and then performs two consecutive knocks on the host vehicle M. The recognizer 130 recognizes that the occupant performs two consecutive knocks on the basis of the sound detected by the specific contact operation detection device 72. The recognizer 130 searches the specific contact operation information 184 using content of the recognized knock, and specifies "a start of the self-propelled parking event relating to entry" associated with the "two consecutive knocks." The self-propelled parking controller 142 executes the self-propelled parking event relating to entry in a case where the command of "a start of the self-propelled parking event relating to entry" is recognized by the recognizer 130.

[(3) Occupant's Stroking Operation for Host Vehicle M]

Figure 8:
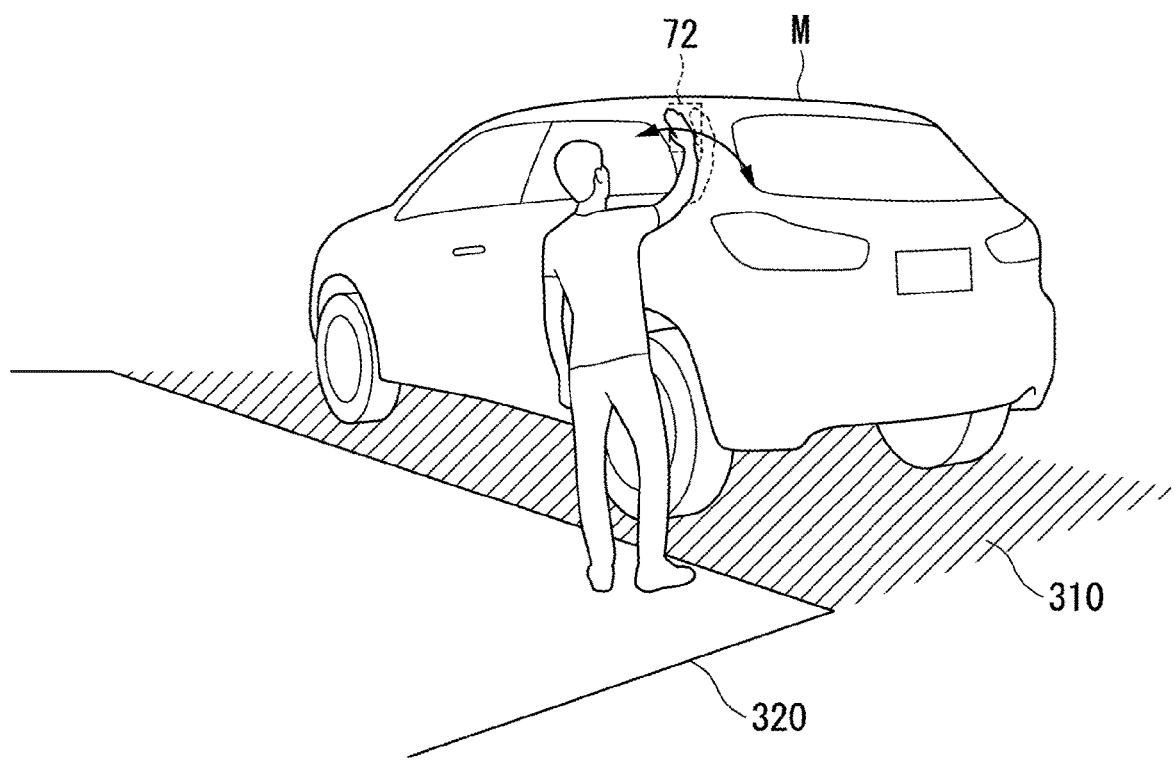
FIG. 8 is a diagram illustrating an example of a start situation based on a stroking operation in the self-propelled parking event relating to entry.

FIG. 8 is a diagram illustrating an example of a start situation based on a stroking operation in the self-propelled parking event relating to entry. When the self-propelled parking event relating to entry is started, the host vehicle M is stopped in the stop area 310, and the occupant exits the host vehicle M in the boarding and exit area 320. The recognizer 130 recognizes the occupant's stroking operation on the basis of the detection result the specific contact operation detection device 72 (the touch panel) after all the doors of the host vehicle M are closed, for example, when the occupant exits the vehicle. The recognizer 130 starts the self-propelled parking event relating to entry on the basis of the recognized stroking operation and the specific contact operation information 184. The specific contact operation information 184 is, for example, information including a record in which information indicating the occupant's stroking operation and a command executed in the host vehicle M (in this example, a start command of the self-propelled parking event relating to entry) are associated with each other. Hereinafter, a case where the specific contact operation information 184 is information including a record in which the start command of the self-propelled parking event relating to entry and the stroking operation are associated with each other will be described. The occupant's stroking operation for the host vehicle M is an example of "an occupant's specific operation performed on a car body."

The command capable of being executed is a stroking operation is, for example, a command capable of being executed even when the occupant of the host vehicle M is not on board the host vehicle M. On the occasion of generation of the specific contact operation information 184, the automated driving control device 100 executes an application for generating the specific contact operation information 184. Since the subsequent processes are the same as the processes when the specific gesture information 182 is generated, the description thereof will not be given.

In FIG. 8, the occupant exits the host vehicle M in the boarding and exit area 320, and then performs an operation on the host vehicle M. The recognizer 130 recognizes that the occupant performs a stroking operation on the basis of the detection result of the specific contact operation detection device 72. The recognizer 130 searches the specific contact operation information 184 using content of the recognized stroking operation, and specifies "a start of the self-propelled parking event relating to entry" associated with the "stroking operation." The self-propelled parking controller 142 executes the self-propelled parking event relating to entry in a case where the command of "a start of the self-propelled parking event relating to entry" is recognized by the recognizer 130.

[Stop Condition of Self-Propelled Parking Event Relating to Entry]

Here, even in a case where an instruction for a start of the self-propelled parking event relating to entry is executed, the self-propelled parking controller 142 does not perform the self-propelled parking event in a case where a predetermined condition indicating that automated parking is not adequate is satisfied (the start is canceled, or is stopped even after the start).

A predetermined condition in which the self-propelled parking controller 142 stops the self-propelled parking event establishes at least one of some or all of the following.

(1) It is recognized that an occupant's terminal device TM is misplaced inside the host vehicle M.

(2) A travelable distance based on the remaining energy amount of the host vehicle M is equal to or less than a criterion.

(3) A failure of a detection device referring to a result of the recognizer 130 is detected.

(4) It is recognized that a person is present inside the host vehicle M.

[(1) Case Where it is Recognized that Occupant's Terminal Device TM is Misplaced Inside Host Vehicle M]

The recognizer 130 extracts a difference between two images on the basis of, for example, the past in-vehicle image captured by the in-vehicle camera 70 and an in-vehicle image captured when the occupant exits the vehicle. The past in-vehicle image is, for example, an image captured in a state in which the occupant is not on board the host vehicle M and baggage is not mounted in the host vehicle M.

Feature data (including a compressed image) of the past in-vehicle image or an image extracted for the purpose of comparison is stored in the storage 180. In a case where a difference is extracted from the two images or the feature data, the recognizer 130 recognizes an object which is present at a point where the difference is generated. The self-propelled parking controller 142 does not perform the self-propelled parking event relating to entry in a case where the recognition result of the recognizer 130 shows that the object which is present at a point where the difference is generated is the occupant's terminal device TM of the host vehicle M.

Figure 9:
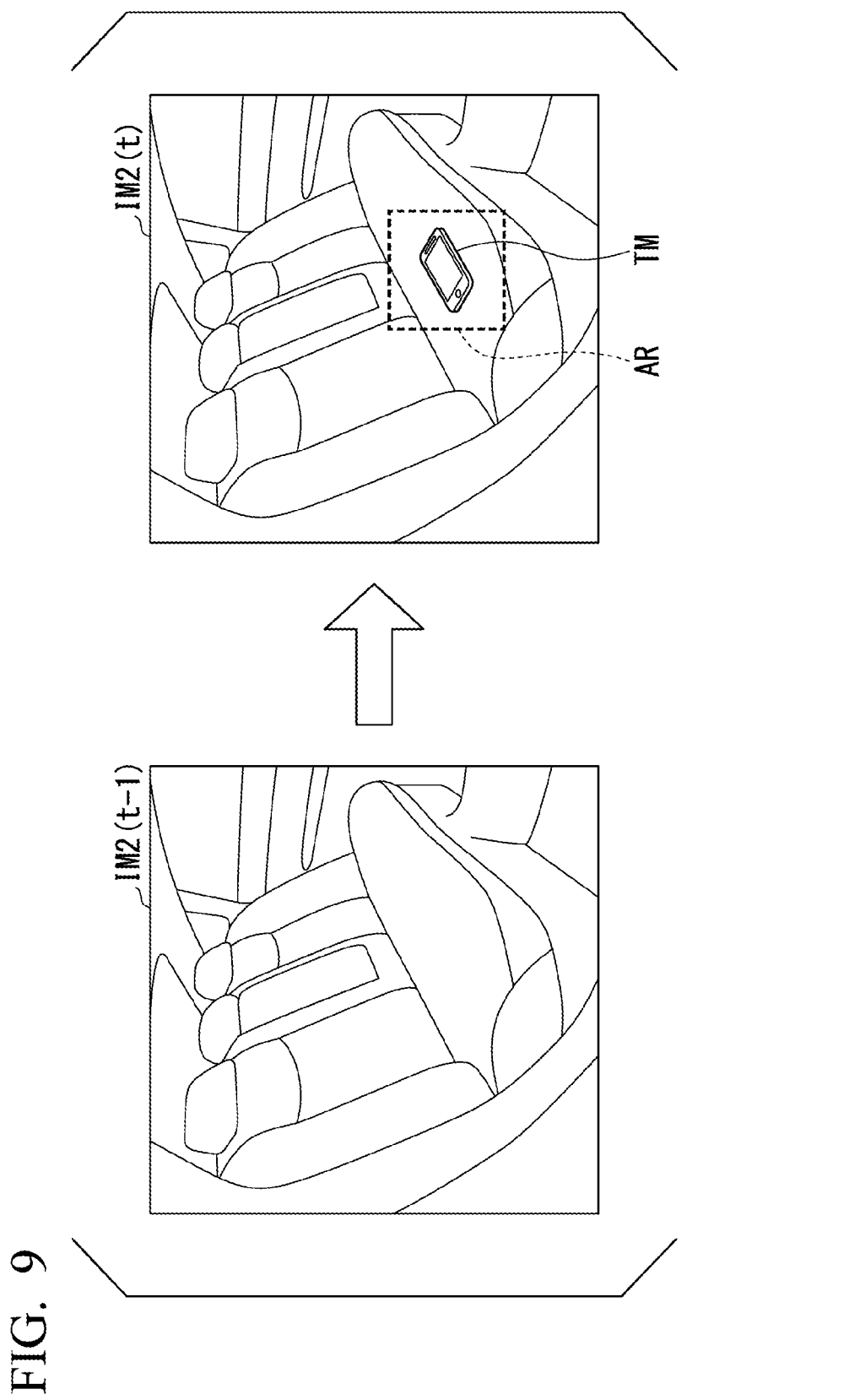
FIG. 9 is a diagram illustrating an example of an in-vehicle image captured by an in-vehicle camera 70 and an in-vehicle image captured in the past.

FIG. 9 is a diagram illustrating an example of an in-vehicle image (IM2(t)) captured by the in-vehicle camera 70 and an in-vehicle image (IM2(t−1)) captured in the past. The recognizer 130 extracts a difference between the in-vehicle image (IM2(t)) captured when the occupant exits the vehicle and the past image (IM2(t−1)). In FIG. 9, the recognizer 130 extracts a difference which is generated at the position of an area AR of the in-vehicle image (IM2(t)). The recognizer 130 recognizes an object which is present at the position of the area AR of the in-vehicle image (IM2(t)). The self-propelled parking controller 142 does not perform the self-propelled parking event relating to entry in a case where the recognition result of the recognizer 130 shows that the object which is present at the position of the area AR is the terminal device TM.

The occupant of the host vehicle M transmits a request for a pickup car using the terminal device TM in a case where the host vehicle M is caused to exit the parking lot PA through the self-propelled parking event relating to exit, but may not be able to transmit the request for a pickup car in a case where the terminal device TM is misplaced inside the host vehicle M on the occasion of entry. The self-propelled parking controller 142 can prompt the occupant to carry the terminal device TM without performing the self-propelled parking event relating to entry in a case where the terminal device TM is misplaced inside the host vehicle M.

In the above, a case where the recognizer 130 recognizes the misplacement of the terminal device TM in the host vehicle M on the basis of the in-vehicle image captured by the in-vehicle camera 70 has been described, but there is no limitation thereto. The recognizer 130 may recognize that the terminal device TM is misplaced in the host vehicle M, for example, in a case where a change in the weight of the host vehicle M (hereinafter referred to as a vehicle weight) is recognized on the basis of the detection result of the detector that detects a vehicle weight. In a case where the terminal device TM has a communication function based on a contactless chip such as radio frequency identifier (RFID) authentication, the recognizer 130 may recognize that the terminal device TM is misplaced in the host vehicle M in a case where communication between the terminal device TM and the automated driving control device 100 is performed using the communication function even after the occupant exits the host vehicle M.

In a case where the recognizer 130 recognizes that the terminal device TM is misplaced in the host vehicle M, the automated driving control device 100 may control a vehicle-mounted instrument of the host vehicle M to notify the occupant of the misplacement of the terminal device TM. For example, the automated driving control device 100 may control a headlight, a blinker, or the like to notify the occupant of the misplacement using light, control an audio device mounted in the host vehicle M to notify the occupant of the misplacement using a sound, control a wiper driving portion to notify the occupant of the misplacement using the movement of the wiper, or control the traveling driving force output device 200 and bring the host vehicle M into operation (for example, vibration or short and repeated forward/backward movement) to notify the occupant of the misplacement using the movement.

[(2) Case Where Travelable Distance Based on Remaining Energy Amount of Host Vehicle M is Equal to or Less Than Criterion]

The self-propelled parking controller 142 calculates a travelable distance of the host vehicle M, for example, on the basis of the remaining capacity of a battery detected by the battery remaining amount detector 74 and information indicating the power efficiency of the host vehicle M. The self-propelled parking controller 142 calculates the travelable distance of the host vehicle M on the basis of the remaining amount of fuel detected by the fuel remaining amount detector 76 and information indicating the fuel efficiency of the host vehicle M. In a case where the sum of the calculated travelable distances is equal to or less than a criterion, the self-propelled parking controller 142 does not perform the self-propelled parking event relating to entry. The criterion is, for example, a distance obtained by adding a route from the stop area 310 to the parking lot PA, a route to travel to the parking space PS within the parking lot PA, and a route from the parking space PS to the stop area 310. Thereby, the self-propelled parking controller 142 can prevent the host vehicle M from stopping in the middle of entry into the parking lot PA or exit from the parking lot PA.

In a case where the host vehicle M includes only an internal-combustion engine as a driving source, the host vehicle M may not include the battery remaining amount detector 74. In a case where the host vehicle M includes only an electric motor as a driving source, the host vehicle M may not include the fuel remaining amount detector 76. In this case, the self-propelled parking controller 142 may determine whether the self-propelled parking event relating to entry is performed on the basis of only the travelable distance calculated based on the detection result of the battery remaining amount detector 74 or only the travelable distance calculated based on the detection result of the fuel remaining amount detector 76, and the criterion. In the following description, in a case where the remaining capacity of a battery and the remaining capacity of fuel need not be distinguished from each other, these are described as a "remaining energy amount."

[(3) Case Where Failure of Detection Device Referring to a Result of Recognizer 130 is Detected]

The self-propelled parking controller 142 does not perform the self-propelled parking event relating to entry, for example, in a case where a failure of the detection device is detected by the failure detection device 18. As described above, the recognizer 130 recognizes the state of the position, and speed, acceleration, or the like of an object located in the periphery of the host vehicle M on the basis of information which is input from the camera 10, the radar device 12, and the viewfinder 14 through the object recognition device 16. Therefore, in a case where the detection device is out of order, the self-propelled parking controller 142 is not able to park the host vehicle M in the parking space PS through the self-propelled parking event. The self-propelled parking controller 142 does not perform the self-propelled parking event relating to entry in a case where a failure of the detection device is detected by the failure detection device 18, and thus can execute the self-propelled parking event relating to entry even in a case where the host vehicle M can be safely parked in the parking lot PA by automated driving.

[(4) Case Where it is Recognized that Person is Present Inside Host Vehicle M]

The recognizer 130 extracts a difference between two images, for example, on the basis of the past in-vehicle image captured by the in-vehicle camera 70 and an in-vehicle image captured when the occupant exits the vehicle. In a case where a difference is extracted from two images, the recognizer 130 recognizes an object which is present at a point where the difference is generated. The self-propelled parking controller 142 does not perform the self-propelled parking event relating to entry in a case where the recognition result of the recognizer 130 shows that the object which is present at a point where the difference is generated is a person.

Here, in a case where a plurality of occupants board the host vehicle M, and some of the occupants are infants or the elderly, infants or the elderly may sometimes be left behind in the host vehicle M after another occupant exits the vehicle in the boarding and exit area 320. In a case where it is difficult for occupants who are left behind to exit the vehicle by themselves (that is, in case of infants or the elderly), the host vehicle M being parked in the parking lot PA by the self-propelled parking event may cause injury to the occupants' health. In a case where occupants are left behind in the host vehicle M, the self-propelled parking controller 142 can secure the safety of the occupants without performing the self-propelled parking event relating to entry. By the above-described process, an occupant who has already exited the host vehicle M can recognize that the self-propelled parking event is not performed (is stopped), and take notice of occupants left behind in the host vehicle M. The self-propelled parking event being stopped may be clearly shown to an occupant who has already exited the host vehicle M, for example, by a physical operation such as no blinking of a lamp body that blinks in a case where the self-propelled parking event is started or no folding of mirrors of the host vehicle M in addition for the host vehicle M not to start the self-propelled parking event (parking operation).

[Operation Flow]

Figure 10:
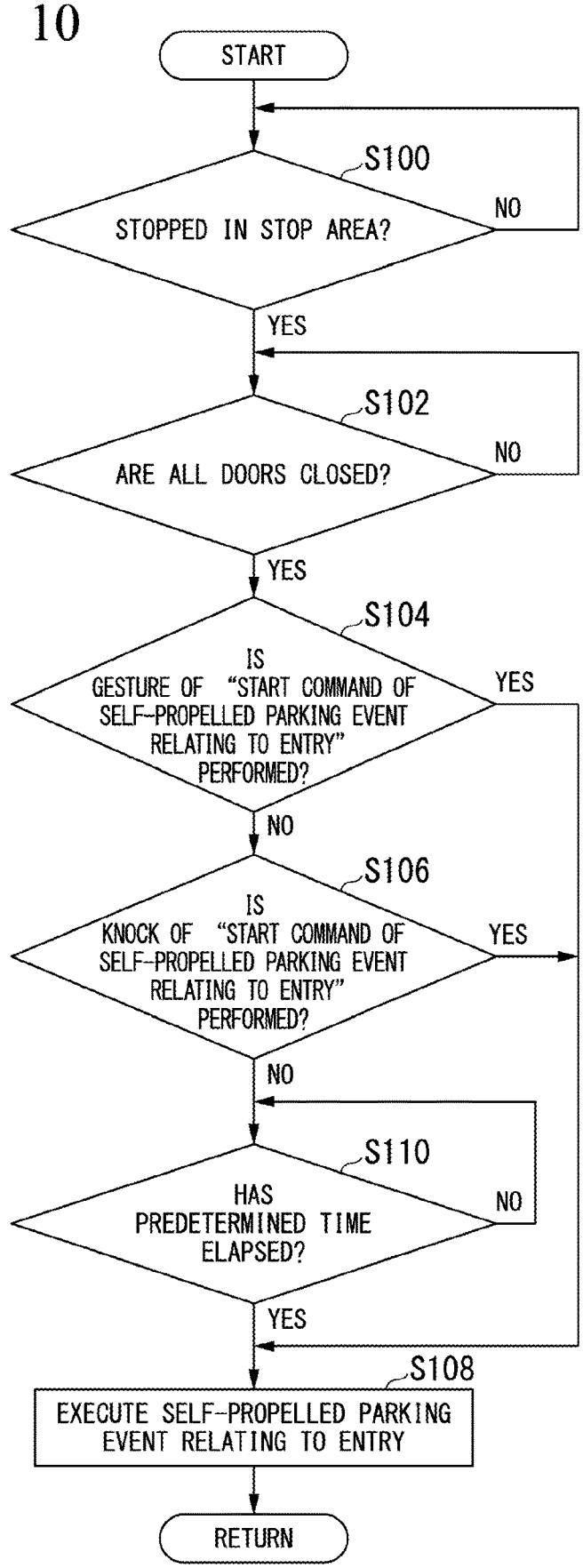
FIG. 10 is a flow chart illustrating a series of flows of start processing of the self-propelled parking event relating to entry.

FIG. 10 is a flow chart illustrating a series of flows of start processing of the self-propelled parking event relating to entry. First, the self-propelled parking controller 142 determines whether the recognition result of the recognizer 130 shows that the host vehicle M is stopped in the stop area 310 (step S100).

The self-propelled parking controller 142 stands by until it is shown that the host vehicle M is stopped in the stop area 310. In a case it is recognized by the recognizer 130 that the host vehicle M is stopped in the stop area 310, the self-propelled parking controller 142 determines whether the recognition result of the recognizer 130 shows that all the doors of the host vehicle M are closed (step S102). The self-propelled parking controller 142 stands by until all the doors of the host vehicle M are closed.

After all the doors of the host vehicle M stopped in the stop area 310 are closed, the self-propelled parking controller 142 determines whether it is recognized by the recognizer 130 that an occupant who has exited the host vehicle M has performed a gesture associated with "a start command of the self-propelled parking event relating to entry" (step S104). In a case where it is recognized by the recognizer 130 that the occupant who has exited the host vehicle M has performed a gesture associated with "a start command of the self-propelled parking event relating to entry," the self-propelled parking controller 142 executes the self-propelled parking event relating to entry (step S108).

In a case where it is not recognized by the recognizer 130 that a gesture has been performed, the self-propelled parking controller 142 determines whether it is recognized by the recognizer 130 that the occupant who has exited the host vehicle M has performed a knock associated with "a start command of the self-propelled parking event relating to entry" (step S106). In a case where it is recognized by the recognizer 130 that the occupant who has exited the host vehicle M has performed a knock associated with "a start command of the self-propelled parking event relating to entry," the self-propelled parking controller 142 executes the self-propelled parking event relating to entry (step S108).

In a case where a gesture and a knock are not recognized by the recognizer 130, the self-propelled parking controller 142 determines whether a predetermined time has elapsed after all the doors of the host vehicle M stopped in the stop area 310 are closed (step S110). The self-propelled parking controller 142 stands by until the predetermined time has elapsed after all the doors of the host vehicle M stopped in the stop area 310 are closed. In a case where it is determined that the predetermined time has elapsed after all the doors of the host vehicle M stopped in the stop area 310 are closed, the self-propelled parking controller 142 executes the self-propelled parking event relating to entry (step S108).

In a case where a gesture or a knock is not recognized by the recognizer 130, the self-propelled parking controller 142 may not execute the self-propelled parking event relating to entry. In this case, the process of step S110 is omitted.

Figure 11:
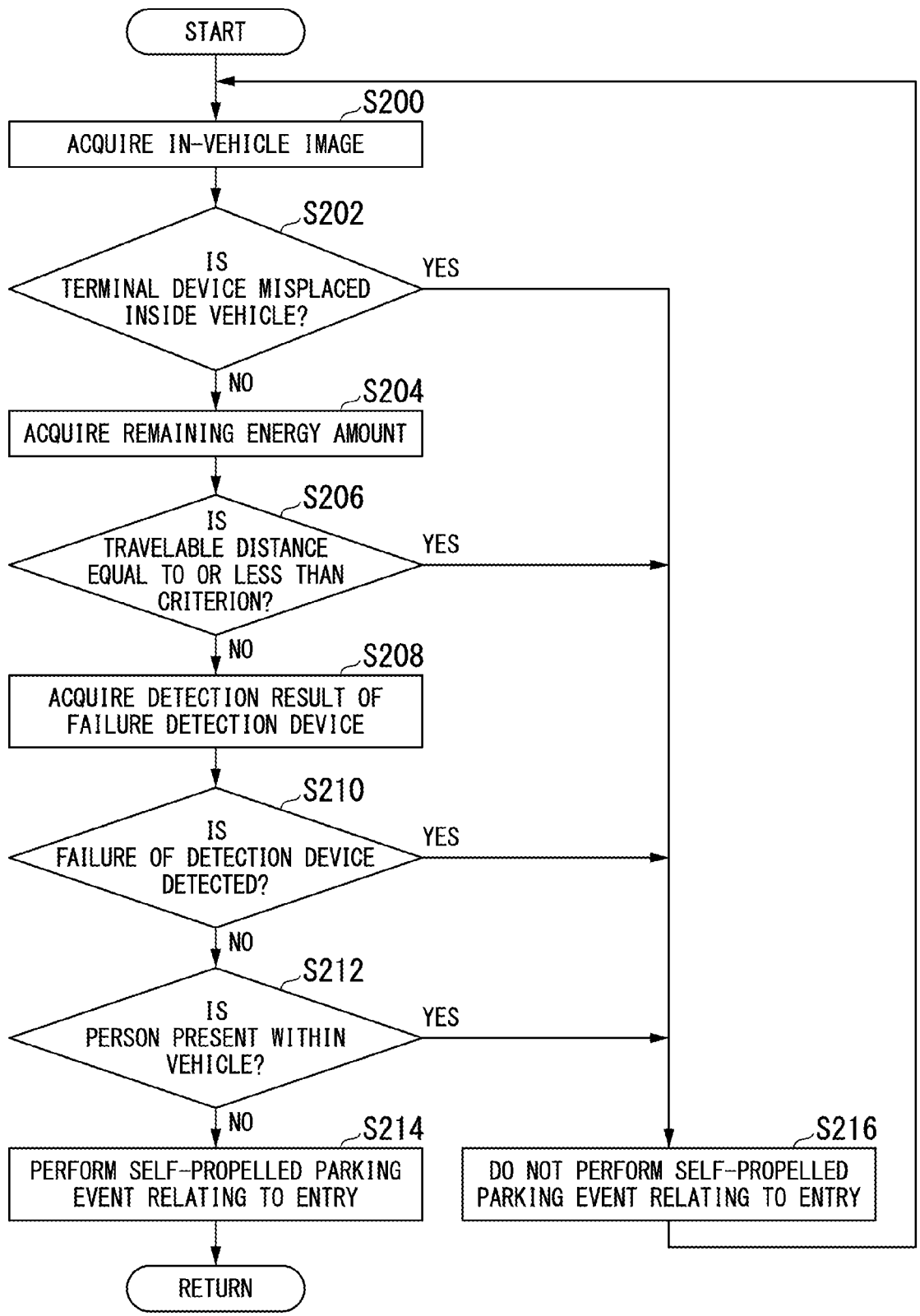
FIG. 11 is a flow chart illustrating a series of flows of stop processing of the self-propelled parking event relating to entry.

FIG. 11 is a flow chart illustrating a series of flows of stop processing of the self-propelled parking event relating to entry. The flow chart shown in FIG. 11 shows processing performed while the self-propelled parking event relating to entry is executed by the self-propelled parking controller 142. First, the recognizer 130 acquires an in-vehicle image captured by the specific contact operation detection device 72 (step S200).

The self-propelled parking controller 142 determines whether the recognition result of the recognizer 130 shows that the terminal device TM is misplaced inside the vehicle (step S202). In a case where it is determined that the terminal device TM is misplaced inside the vehicle, the self-propelled parking controller 142 advances the processing to step S216.

Next, the self-propelled parking controller 142 acquires, for example, at least one of the remaining capacity of a battery detected by the battery remaining amount detector 74 and the remaining amount of fuel detected by the fuel remaining amount detector 76 (step S204). The self-propelled parking controller 142 determines whether a travelable distance of the host vehicle M calculated on the basis of information indicating the acquired remaining capacity of a battery and the power efficiency of the host vehicle M and information indicating the remaining amount of fuel and the fuel efficiency of the host vehicle M is equal to or less than a criterion (step S206). In a case where the travelable distance of the host vehicle M is equal to or less than the criterion, the self-propelled parking controller 142 advances the processing to step S216.

In a case where the travelable distance of the host vehicle M is larger than the criterion, the self-propelled parking controller 142 acquires a detection result of the failure detection device 18 (step S208). The self-propelled parking controller 142 determines whether a failure of the detection device has been detected by the failure detection device 18 (step S210). In a case where a failure of the detection device is detected by the failure detection device 18, the self-propelled parking controller 142 advances the processing to step S216.

In a case where a failure of the detection device is not detected by the failure detection device 18, the self-propelled parking controller 142 determines whether the recognition result of the recognizer 130 shows that a person is present inside the vehicle (step S212). In a case where the recognition result of the recognizer 130 shows that a person is present inside the vehicle, the self-propelled parking controller 142 advances the processing to step S216.

The self-propelled parking controller 142 performs the self-propelled parking event relating to entry in a case where all of the conditions in which it is recognized that the occupant's terminal device TM is misplaced inside the host vehicle M (condition 1), a travelable distance based on the remaining energy amount of the host vehicle M is equal to or less than a criterion (condition 2), a failure of the detection device referring to a result of the recognizer 130 is detected (condition 3), and it is recognized that a person is present inside the host vehicle M (condition 4) are not satisfied (step S214).

The self-propelled parking controller 142 does not perform the self-propelled parking event relating to entry in a case where any of the conditions in which it is recognized that the occupant's terminal device TM is misplaced inside the host vehicle M (condition 1), a travelable distance based on the remaining energy amount of the host vehicle M is equal to or less than a criterion (condition 2), a failure of the detection device referring to a result of the recognizer 130 is detected (condition 3), and it is recognized that a person is present inside the host vehicle M (condition 4) is satisfied (step S216). The self-propelled parking controller 142 determines again whether (condition 1) to (condition 4) are satisfied back to step S200 after step S216, and performs the self-propelled parking event relating to entry in a case where none of these conditions are satisfied (step S214).

Conclusion of Embodiment

As described above, the automated driving control device 100 of the present embodiment includes the recognizer 130 that recognizes the peripheral environment of the host vehicle M and driving controllers that automatically perform speed control and steering control of the host vehicle M (in this example, the behavior plan generator 140 and the second controller 160) on the basis of the recognition result of the recognizer 130, and the self-propelled parking controller 142 causes the host vehicle M to travel and stop at a parking lot (the parking lot PA) in a case where a specific operation performed on or toward a car body by an occupant who has exited the vehicle is recognized by the recognizer 130 after the occupant exits the host vehicle M, whereby it is possible to improve convenience. The recognizer 130 may perform any of the recognition of a gesture and the recognition of a knock, or may change a target recognized on the basis of the weather or the priority of recognition. The recognizer 130 recognizes a gesture preferentially rather than a knock because a car body gets wet in case it rains, for example, on the basis of the weather, and recognizes a knock preferentially rather than a gesture because it is difficult to recognize a gesture through an image in case it is foggy.

The automated driving control device 100 of the present embodiment includes the recognizer 130 that recognizes the peripheral situation of the host vehicle M, driving controllers that automatically perform speed control and steering control of the host vehicle M (in this example, the behavior plan generator 140 and the second controller 160) on the basis of the recognition result of the recognizer 130, and a determiner that determines whether a predetermined condition indicating that automated parking is not adequate is satisfied (in this example, the self-propelled parking controller 142) when an occupant exits the host vehicle M, and the self-propelled parking controller 142 causes the host vehicle M to start to travel from a stop state and stop at a parking lot in a case where it is determined that the predetermined condition is not satisfied and causes the host vehicle M not to travel and stop at the parking lot (the parking lot PA) in a case where it is determined that the predetermined condition is satisfied, whereby it is possible to suppress the occurrence of inconvenience due to inadvertent automatic control of the host vehicle M in a state in which the perimeter of the vehicle M is not monitored by the occupant. In automated parking assistance in which a user (an occupant or an occupant candidate) has a duty to monitor the perimeter, the user watches parking of the host vehicle M to the end, whereas in automated parking in which the user has no duty to monitor the perimeter, the user does not watch parking of the host vehicle M to the end. Thus, even when the user takes notice of an accident after the start of automated parking, the user is not likely to cope with the accident, but it is possible to suppress the occurrence of inconvenience by causing automated parking not to be started on the basis of the establishment of the predetermined condition before the start of automated parking.

[Hardware Configuration]

Figure 12:
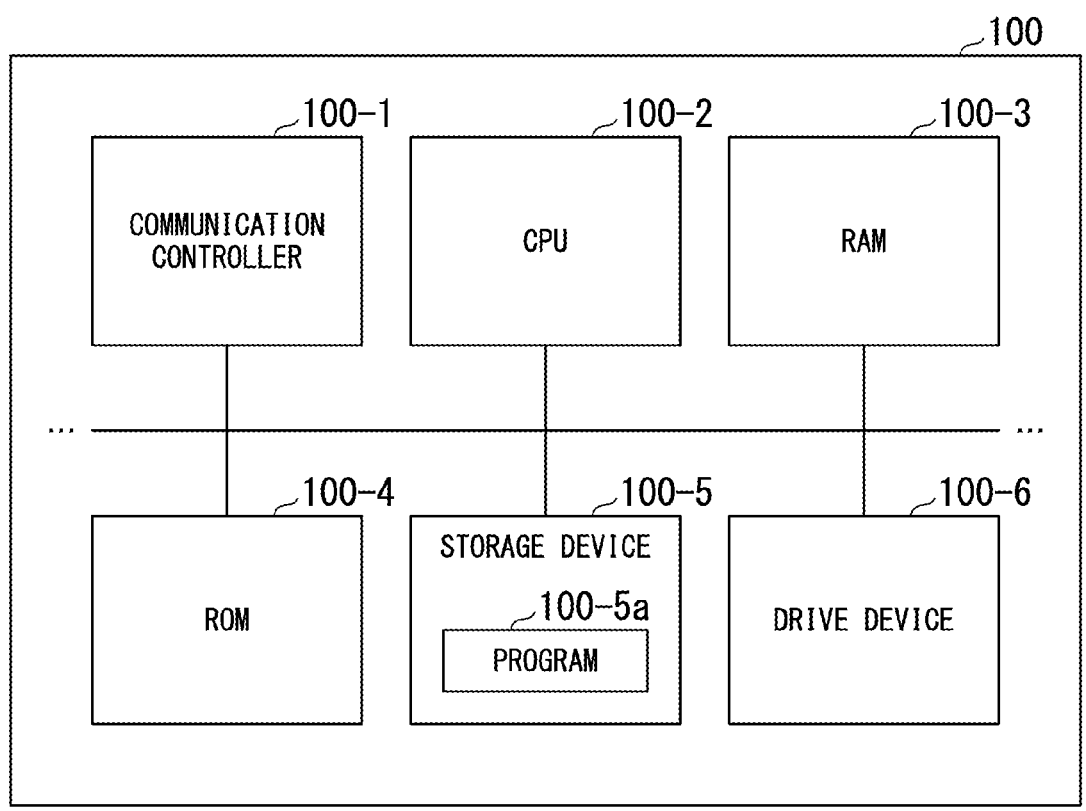
FIG. 12 is a diagram illustrating an example of a hardware configuration of an automated driving control device according to the embodiment.

FIG. 12 is a diagram illustrating an example of a hardware configuration of the automated driving control device 100 of the embodiment. As shown in the drawing, the automated driving control device 100 is configured such that a communication controller 100-1, a CPU 100-2, a random access memory (RAM) 100-3 used as a working memory, a read only memory (ROM) 100-4 that stores a boot program or the like, a storage device 100-5 such as a flash memory or a hard disk drive (HDD), a drive device 100-6, and the like are connected to each other through an internal bus or a dedicated communication line. The communication controller 100-1 performs communication with components other than the automated driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the recognizer 130, the behavior plan generator 140, and the self-propelled parking controller 142 are realized.

The above-described embodiment can be represented as follows.

An automated driving control device including: a storage device having a program stored therein; and a hardware processor, wherein the hardware processor executes the program stored in the storage, to thereby recognize a peripheral situation of a vehicle, automatically perform speed control and steering control of the vehicle on the basis of a recognition result; determine whether a predetermined condition indicating that automated parking is not adequate is satisfied when a user exits the vehicle; cause the vehicle to start to travel from a stop state and stop at a parking lot in a state in which the perimeter of the vehicle is not monitored by the user or persons other than the user in a case where it is determined that the predetermined condition is not satisfied; and cause the vehicle not to start to travel from a stop state and stop at a parking lot in a state in which the perimeter of the vehicle is not monitored by the user or persons other than the user in a case where it is determined that the predetermined condition is satisfied.

The above-described embodiment can be represented as follows.

An automated driving control device including: a storage device having a program stored therein; and a hardware processor, wherein the hardware processor executes the program stored in the storage, to thereby recognize a peripheral environment of a vehicle, automatically perform speed control and steering control of the vehicle on the basis of a recognition result, and cause the vehicle to start to travel from a stop state in a case where a user exits the vehicle and then a specific operation performed on or toward a car body who the user who has exited the vehicle is recognized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
   a recognizer that recognizes a peripheral situation of a vehicle;
   a driving controller that automatically performs speed control and steering control of the vehicle on the basis of a recognition result of the recognizer; and
   a determiner that determines whether a predetermined condition indicating that automated parking is not adequate is satisfied when a user exits the vehicle,
   wherein the driving controller causes the vehicle to start to travel from a stop state and stop at a parking lot in a state in which the perimeter of the vehicle is not monitored by the user or persons other than the user in a case where it is determined by the determiner that the predetermined condition is not satisfied, and causes the vehicle not to start to travel from a stop state and stop at a parking lot in a state in which the perimeter of the vehicle is not monitored by the user or persons other than the user in a case where it is determined by the determiner that the predetermined condition is satisfied,
   further comprising a failure detector that detects a failure of a detection device, other than relative to a terminal device that executes an instruction to the vehicle, referring to a result of the recognizer,
   wherein the predetermined condition includes that the failure of the detection device relative is detected by the failure detector.

2. The vehicle control system according to claim 1, wherein the recognizer further recognizes an object which is placed inside the vehicle, and
   the predetermined condition includes that it is recognized by the recognizer that a terminal device executing an instruction to cause the vehicle to exit the parking lot is placed inside the vehicle.

3. The vehicle control system according to claim 1, further comprising an acquirer that acquires a remaining energy amount of the vehicle,
   wherein the predetermined condition includes that a travelable distance that the vehicle is able to travel with the remaining energy amount acquired by the acquirer is equal to or less than a criterion.

4. The vehicle control system according to claim 1, wherein the recognizer further recognizes an object which is present inside the vehicle, and
   the predetermined condition includes that it is recognized by the recognizer that a person is present inside the vehicle.

5. The vehicle control system according to claim 3, further comprising a notificator that notifies the user of various types of information,
   wherein the determiner determines whether the predetermined condition is satisfied after a user exits the vehicle, and
   the notificator notifies the user's terminal device that the predetermined condition is satisfied in a case where it is determined that the predetermined condition is satisfied after the user exits the vehicle.

6. The vehicle control system according to claim 1, wherein the driving controller causes the vehicle to start to travel from a stop state and stop at a parking lot in a state in which the perimeter of the vehicle is not monitored by the user or persons other than the user in a case where it is determined by the determiner that the predetermined condition is not satisfied after it is determined by the determiner that the predetermined condition is satisfied.

7. The vehicle control system according to claim 1, wherein the detection device in a non-failure state detects impediments to movement of the vehicle about a periphery of the vehicle.

8. A vehicle control method comprising causing a computer to:
   recognize a peripheral situation of a vehicle;
   automatically perform speed control and steering control of the vehicle on the basis of a recognition result;
   determine whether a predetermined condition indicating that automated parking is not adequate is satisfied when a user exits the vehicle;
   cause the vehicle to start to travel from a stop state and stop at a parking lot in a state in which the perimeter of the vehicle is not monitored by the user or persons other than the user in a case where it is determined that the predetermined condition is not satisfied; and
   cause the vehicle not to start to travel from a stop state and stop at a parking lot in a state in which the perimeter of the vehicle is not monitored by the user or persons other than the user in a case where it is determined that the predetermined condition is satisfied.

9. A computer readable non-transitory storage medium having a program stored therein, the program causing a computer to:
   recognize a peripheral situation of a vehicle;
   automatically perform speed control and steering control of the vehicle on the basis of a recognition result;
   determine whether a predetermined condition indicating that automated parking is not adequate is satisfied when a user exits the vehicle;
   detecting whether a detection failure is indicated, other than relative to a terminal device that executes an instruction to the vehicle, referring to a result of the recognition of the peripheral situation of the vehicle, wherein the predetermined condition determined includes that the detection failure is detected;
   cause the vehicle to start to travel from a stop state and stop at a parking lot in a state in which the perimeter of the vehicle is not monitored by the user or persons other than the user in a case where it is determined that the predetermined condition is not satisfied; and
   cause the vehicle not to start to travel from a stop state and stop at a parking lot in a state in which the perimeter of the vehicle is not monitored by the user or persons other than the user in a case where it is determined that the predetermined condition is satisfied.

10. The computer readable non-transitory storage medium according to claim 9, wherein the detection failure is a failure to provide feedback regarding a state of an environment about a periphery of the vehicle relative to impediments to movement of the vehicle.

* * * * *